No. 853,722. PATENTED MAY 14, 1907.
J. B. McKENNAN.
HOT BLAST VALVE.
APPLICATION FILED APR. 27, 1906.

5 SHEETS—SHEET 1.

Witnesses
Inventor
J. B. McKennan
By Walter D. Groesbeck, Attorney

No. 853,722. PATENTED MAY 14, 1907.
J. B. McKENNAN.
HOT BLAST VALVE.
APPLICATION FILED APR. 27, 1906.
5 SHEETS—SHEET 2.
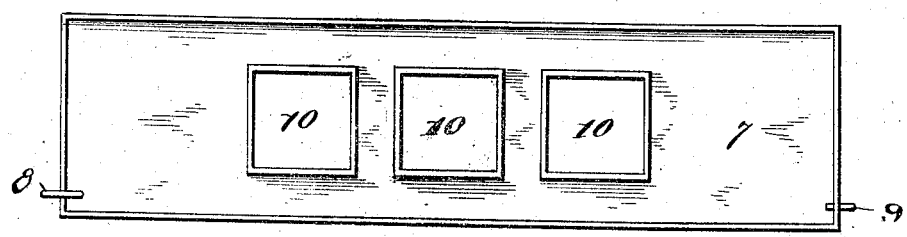
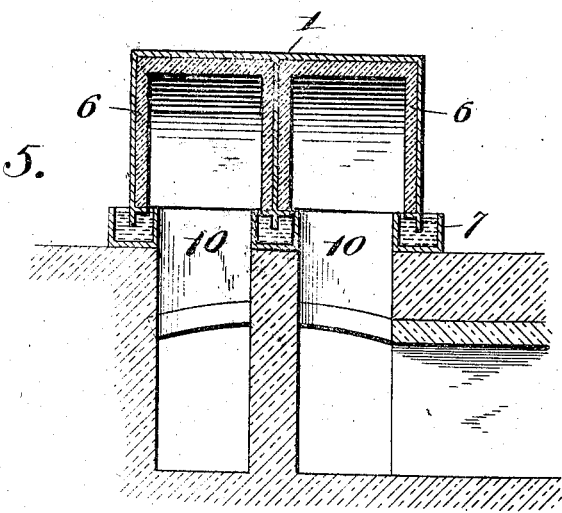
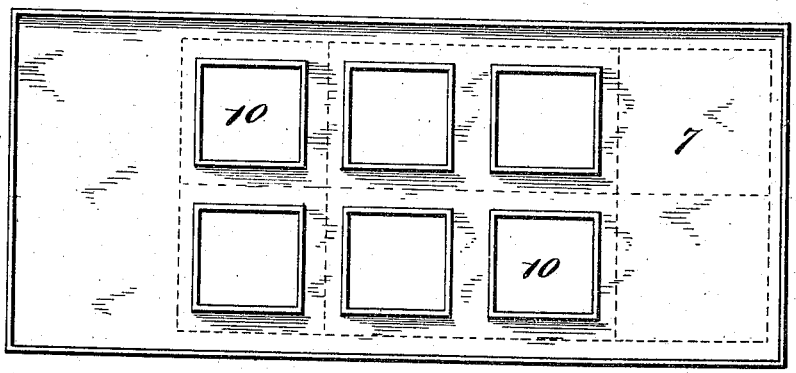

No. 853,722. PATENTED MAY 14, 1907.
J. B. McKENNAN.
HOT BLAST VALVE.
APPLICATION FILED APR. 27, 1906.

5 SHEETS—SHEET 3.

No. 853,722. PATENTED MAY 14, 1907.
J. B. McKENNAN.
HOT BLAST VALVE.
APPLICATION FILED APR. 27, 1906.

5 SHEETS—SHEET 4.

No. 853,722. PATENTED MAY 14, 1907.
J. B. McKENNAN.
HOT BLAST VALVE.
APPLICATION FILED APR. 27, 1906.

5 SHEETS—SHEET 5.

UNITED STATES PATENT OFFICE.

JACOB BOWMAN McKENNAN, OF PUEBLO, COLORADO.

HOT-BLAST VALVE.

No. 853,722.      Specification of Letters Patent.      Patented May 14, 1907.

Application filed April 27, 1906. Serial No. 313,911.

*To all whom it may concern:*

Be it known that I, JACOB BOWMAN MC-KENNAN, a citizen of the United States, residing at Pueblo, in the county of Pueblo and State of Colorado, have invented certain new and useful Improvements in Furnace-Valves, of which the following is a specification.

My invention relates to improvements in water-sealed valves for regenerative furnaces and the like; and its object is to provide an opening and closing valve and a reversing valve, which latter is in effect a diverting flue, and which valves shall avoid the defects of valves of the mushroom, butterfly and other types.

The valve may be either a simple opening and closing valve controlling only two flue terminals; or it may be a "three-way" reversing valve; that is, a valve controlling three flue terminals, and either form may be duplicated either side-by-side or end-to-end; but in all cases the valve proper or "hood," is entirely unincIosed above and all flue terminals controlled by the valve or hoods rise through the water-pan, rendering hoods, pan and operating mechanism easy of access.

So far as I am aware, valves heretofore used have been either arranged to raise and lower or to reciprocate within a closed valve chamber or they have been a movable part of such valve chamber or they have been of the rotative type. I believe that reciprocating water-sealed valves, having supplemental sealing hoods are new and I intend to claim the same broadly.

My improved valves are particularly adapted for use with the flue systems, for regenerative furnaces, of the types described in my copending application Serial No. 316,773.

Figure 1:
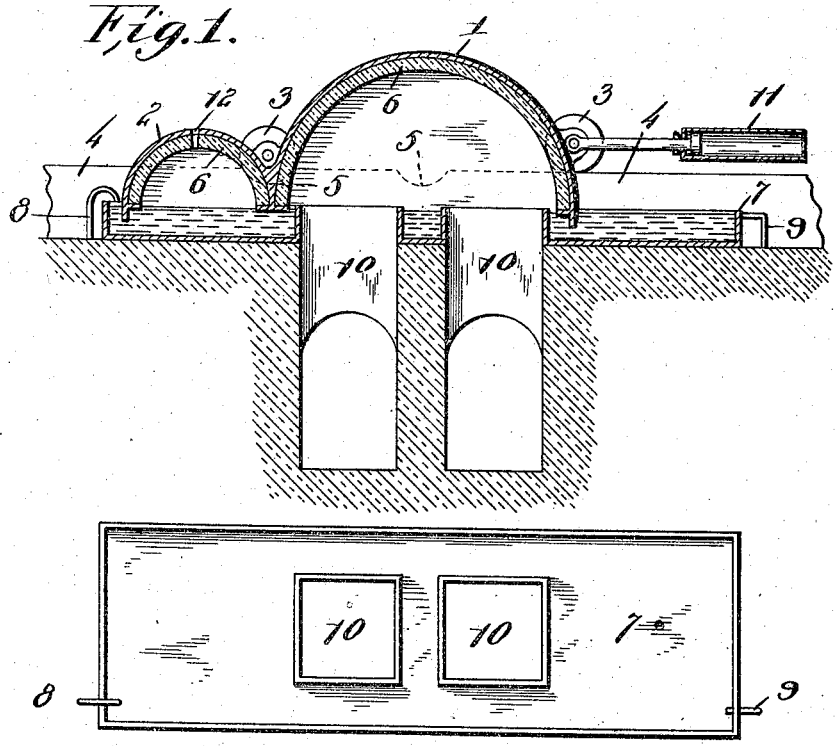
Figure 2:
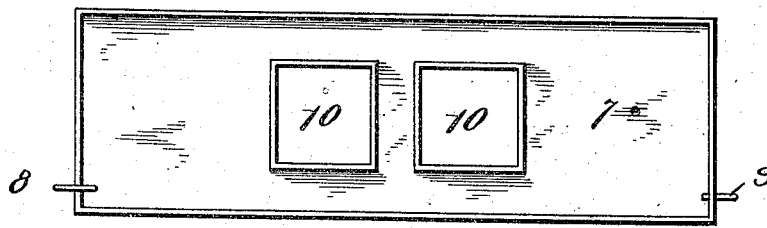
Figure 3:
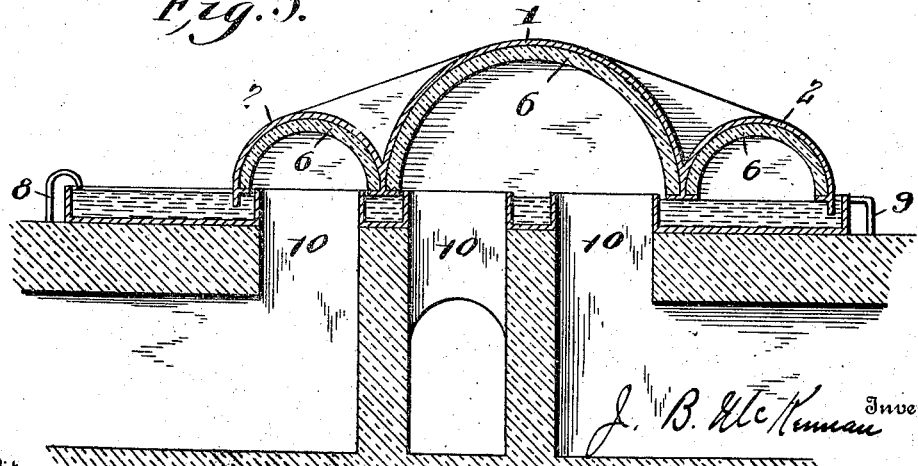
Figure 7:
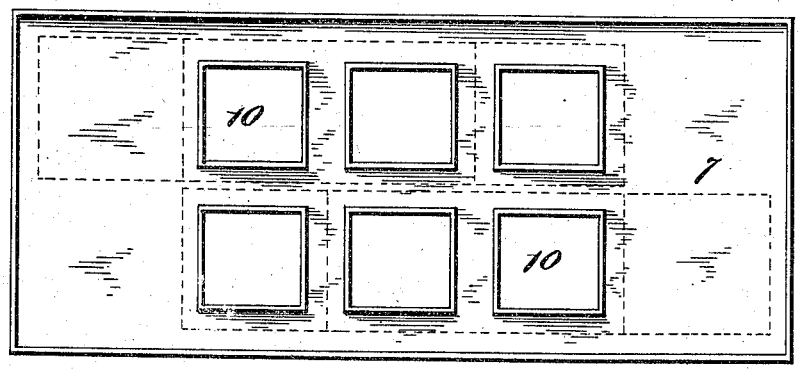
Figure 8:
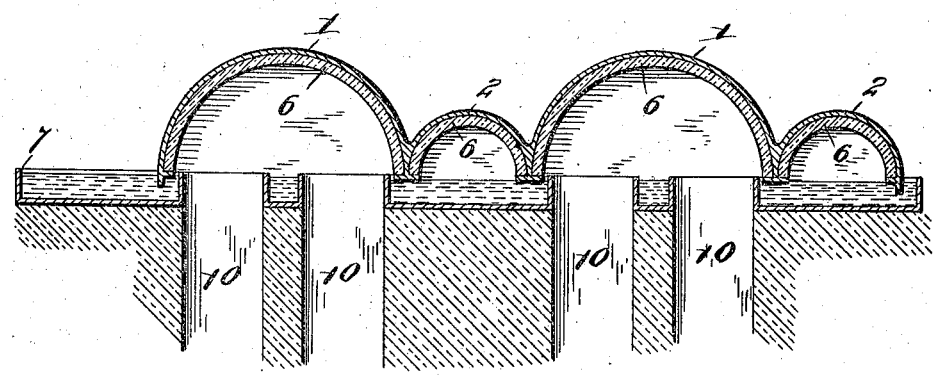
Figure 9:
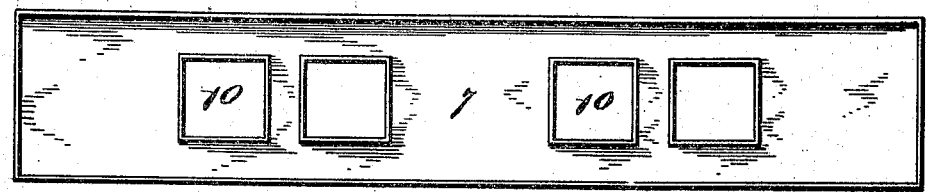
Figure 10:
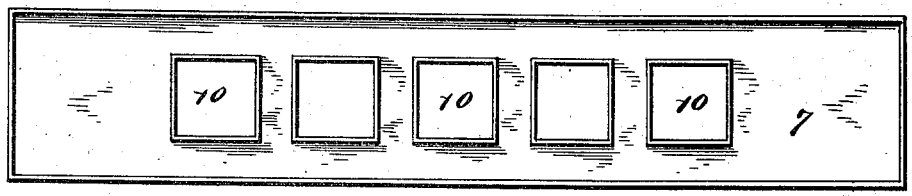
Figure 12:
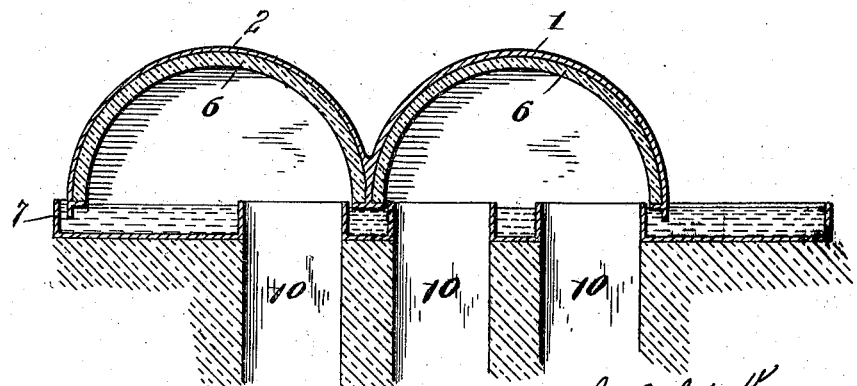
Figure 13:
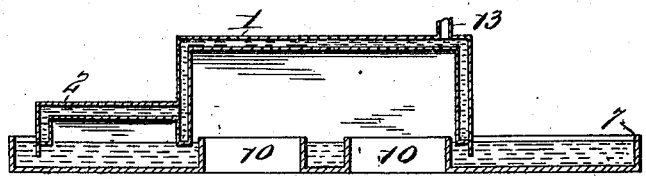
Figure 14:
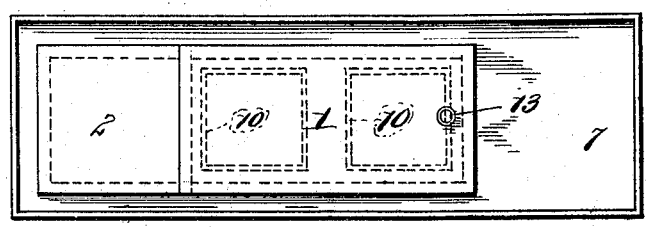
Figure 15:
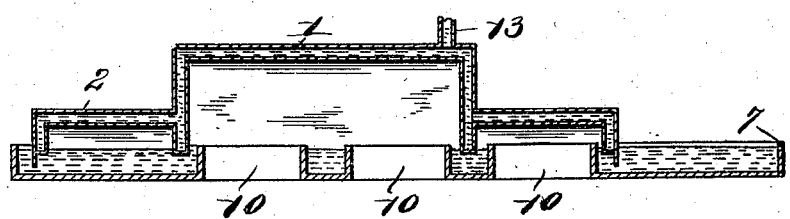
Figure 16:
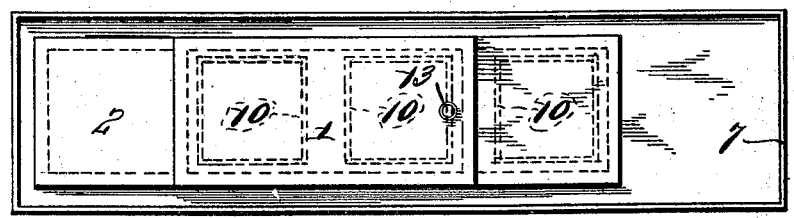

In the accompanying drawings: Figure 1 is a longitudinal section of a simple opening and closing water-sealed valve constructed according to my invention; Fig. 2 is a plan of the water-pan for the same; Fig. 3 is a longitudinal section of a form of a simple water-sealed reversing-valve or diverting flue; Fig. 4 is a plan of the water-pan for same; Fig. 5 is a transverse section of a double valve which may be an opening and closing valve of the type shown in Fig. 1, or a reversing valve of the type shown in Fig. 3; Fig. 6, is a plan of the water pan for same when used as a reversing valve; Fig. 7 is a plan similar to Fig. 6, adapted to a duplex reversing valve, the opposite positions of the independent valves being shown in dotted lines; Fig. 8 is a longitudinal section; Fig. 9 a plan of water-pan of a tandem opening and closing valve; Fig. 10 is a longitudinal section and Fig. 11 a plan of pan of a tandem reversing valve; Fig. 12 is a longitudinal section of a modified form of a simple reversing valve hereinafter referred to; Fig. 13 is a longitudinal section and Fig. 14 a plan of a water-cooled and water-sealed opening and closing valve; Fig. 15 a longitudinal section and Fig. 16 a plan of a similar water-cooled and water-sealed simple reversing valve.

Like numerals refer to similar parts throughout the several figures.

1 represents in a general way the valve hood integral with either or both ends of which are supplemental hoods 2.

3, 3, (Fig. 1) represent truck wheels supporting the hood and running upon tracks 4.

5, 5, are suitably located depressions in the tracks 4, to permit one pair of truck wheels to fall and lower the valve to sealing position after it has cleared the interior ribs of the water-pan which surround the flues. By this construction, the valve may be reciprocated without lifting the entire valve.

6 is a suitable refractory lining for the hoods.

7 is the water-pan, provided with a suitable supply pipe 8 and discharge pipe 9, to maintain the water seal at a practically constant level.

10, 10, represent substantially vertical and parallel extensions of the flues to be controlled by the various forms of valves, and such flues may be air, gas, or draft flues, according to the location of the valve and the direction of the current therethrough, as will be readily understood.

11, (Fig. 1) represents diagrammatically suitable actuating means for the valve, which means may comprise a fluid pressure cylinder having a piston and a piston-rod removably connected to the valve-hood in any desired manner so that the valves may be readily detached for repairs. It will be understood that the other forms of valves shown may be supported and reciprocated in like manner and that all forms are readily removable from their water-pans.

12, (Fig. 1) represents a vent for the supplemental hood which may be provided when the flue sealed by said hood has a stack connection. Under such conditions, where the valve is in the position of Fig. 6, the vent acts to equalize the internal and external fluid pressures and to prevent the temporary rise of level of liquid in the water-pan which would otherwise occur; and, when capping a stack flue, but a negligible amount of air enters the valve-hood and passes thence direct to the stack.

Referring now to the figures in order, the operation of the valves is as follows:—

In Fig. 1, the valve is shown in open position, that is, connecting the flues 10, 10, to connect the air or gas supply flue with the regenerator chamber, or the latter with the stack, as the case may be. When the valve is moved to the opposite end of its stroke, both flues are closed and water-sealed.

In Fig. 3, the valve is shown as connecting a central air- or gas-supply flue with the right-hand regenerator or furnace flue and sealing the left-hand flue. In its reversed position, it is evident that the supply will be connected with the left-hand flue and the opposite outer flue sealed. In this construction, it will be understood that separate valves and sets of flues control the supply to the opposite regenerators and the draft to the stack connections.

In the arrangement shown in Fig. 5 parallel sets of draft flues, or of supply flues, are arranged in proximity, so as to be controlled by a double valve working above a single water-pan which surrounds the vertical portions of all the flues.

In Fig. 7, a like form of pan may accommodate separated duplex valves, capable of reciprocating in opposite directions.

In Figs. 8 and 9, is shown an arrangement by means of which two sets of supply-flues or draft-flues may be opened and closed by a tandem valve driven by a single actuating means.

Figure 11:
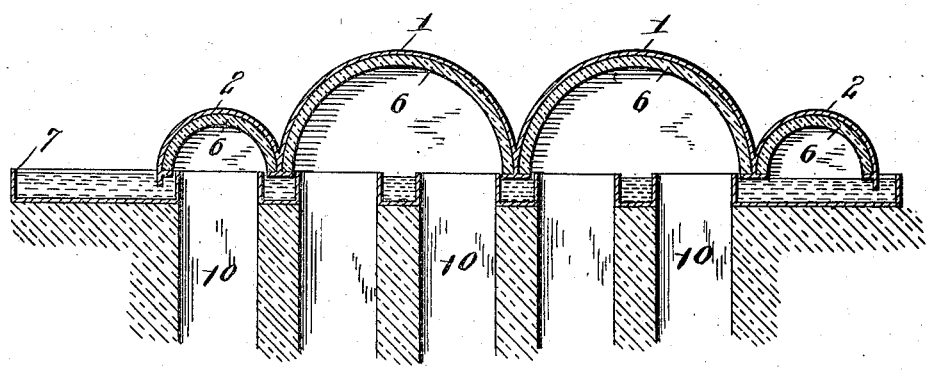

In Figs. 10 and 11, the single tandem reversing valve may control supply and draft in five adjacent flue-ends, in which the central flue is preferably the gas- or air-supply, the adjacent flues on either side thereof are regenerator connections, and the exterior flues are draft flues.

In the modification shown in Fig. 12, the reversing valve is shown with a pair of hoods of equal size, instead of a longer central hood with two supplemental hoods, as in Fig. 3. Or, in other words, the supplemental hoods are combined in a single hood of the same size as the main hood, and each hood may act either as a seal for a single flue or as a diverting flue; as will be readily understood from the figure. In this construction, since each hood always caps at least one flue, the vent 12, shown in Fig. 1, may be omitted.

The modifications shown in Figs. 13 to 16 show the manner in which water-cooling may be substituted for refractory lining in opening and closing or in simple reversing valves. Since the exterior of the hoods is not subjected to the hot gases, any desired form of water-supply connection or overflow outlet may be provided, as at 13. The term "hood" is used in the appended claims in the sense usually applied to that term in the art; that is, as the valve proper, or member immediately capping the flue terminals; as distinguished from the valve-casing or chamber heretofore used to inclose the valve-hood and receiving one or more flue terminals.

Many modifications may be made in valve construction and flue arrangement without departing from my invention; since

What I claim is:—

1. A water-sealed furnace valve having a supplemental flue-sealing hood.

2. A reciprocating water-sealed furnace valve having a supplemental flue-sealing hood.

3. A water-sealed and water-cooled valve having a supplemental flue-sealing hood.

4. A reciprocating, water-sealed furnace valve having a supplemental, vented hood.

5. A three-way, reversing furnace valve having water sealing means for the inactive flue.

6. A reciprocating furnace valve having means for moving one end of said valve in a single plane and the other end thereof in a plurality of planes.

7. In a furnace-valve, in combination, a water-pan arranged to surround a plurality of parallel flue-extremities, a water-sealed valve constructed and arranged to connect pairs of said flues and having a supplemental hood adapted to seal any desired flue or flues, and means for reciprocating said valve.

In testimony whereof I affix my signature in presence of two witnesses.

JACOB BOWMAN McKENNAN.

Witnesses:
JAS. H. ROBINSON,
A. L. BENZ.